INVENTOR.
GEORGE V. GLOWACKI
BY
ATTORNEY

INVENTOR.
GEORGE V. GLOWACKI
BY
ATTORNEY

United States Patent Office 2,947,642
Patented Aug. 2, 1960

2,947,642

CERAMIC COMPOSITIONS

George Vincent Glowacki, Bloomfield, N.J., assignor to Radio Corporation of America, a corporation of Delaware Filed Dec. 19, 1957, Ser. No. 703,806

7 Claims. (Cl. 106—62)

This invention relates to ceramic compositions and methods of fabricating them. More particularly, it relates to improved ceramic insulating materials of the type used, for example, in electron discharge devices.

Some of the parts of high voltage electron discharge devices are usually made of a ceramic. The ceramic employed for such parts as electron tube envelopes and tube spacing members is preferably one which has good mechanical strength. Short leakage paths on the surface of the spacer in such high voltage devices as transmitting tubes cause the conversion of some of the interelectrode high frequency energy into heat. The dielectric loss factor, which is proportional to the electrical energy dissipated, is equal to the dielectric constant of the ceramic times the power factor. The lower the dielectric constant, the lower the amount of energy dissipated. Hence the ceramic composition used for such electron tube parts as spacers should have a low dielectric constant in order to reduce the electrical losses of the device. Since electron tubes dissipate considerable heat, it is desirable that the dielectric and mechanical properties of the ceramic used for electron devices components, such as tube envelopes and spacers, should be satisfactory not only at room temperature but also at the operating temperature of the device.

Ceramics that consist of over four-fifths alumina have in the past been found to exhibit high mechanical strength and excellent dielectric qualities. However, such ceramics are difficult to manufacture in ordinary commercial kilns because they require very high firing temperatures. Pure aluminum oxide melts at about 2035° C. Ceramic compositions containing nine-tenths or more alumina generally vitrify at temperatures above about 1600° C., while the ordinary commercial production kilns operate in the range of about 1285° C. to about 1600° C. Various fluxes have been added to high-alumina ceramics in order to lower the firing temperature required. The fluxes are usually such materials as manganese oxide, barium oxide, magnesium oxide, silicon dioxide, and the like. However, these fluxes have not been entirely satisfactory. If small amounts of the fluxes are used, the firing temperature of the composition remains too high. If sufficiently large amounts of the fluxes are used so as to lower the firing temperature below about 1600° C., the resulting ceramic compositions have serious drawbacks, such as loss of mechanical strength or loss of electrical insulating properties, or a tendency to warp during firing.

It is therefore an object of this invention to provide an improved ceramic body having high mechanical strength and good electrical insulating properties.

Another object of the invention is to provide an improved high-alumina ceramic batch which can be vitrified at temperatures below 1600° C.

Still another object of the invention is to provide an improved ceramic composition of matter which retains good mechanical strength and good dielectric properties at elevated temperatures.

Yet another object of the invention is to provide an improved high-alumina ceramic having a low dielectric constant and having relatively little tendency to warp during firing.

But another object of the invention is to provide an improved ceramic body which can be formed at temperatures below 1600° C., and which exhibits a high modulus of rupture and a low dielectric constant.

These and other objects and advantages are attained in accordance with the invention by providing a ceramic composition which comprises 85 percent to 92 percent aluminum oxide, 4 percent to 7 percent magnesium oxide, 2 percent to 4 percent silicon dioxide, 2 percent to 6 percent calcium oxide, and 0 to 3 percent beryllium oxide. The silicon dioxide may be combined with some of the calcium oxide and added in the form of calcium silicate, $CaSiO_3$. The calcium oxide is preferably added in the form of a fused compound of lime and alumina in the molar proportion of 5:3. This lime-alumina compound has the formula $5CaO \cdot 3Al_2O_3$. The compound is characterized by isometric crystallographic form, and has a melting point of 1455° C. This compound is designated in the application as pentacalcium tri-aluminate. Ceramic compositions prepared in accordance with this invention can be fired at temperatures below 1600° C.

The invention will be described in greater detail in connection with the accompanying drawing, in which.

Figure 1A:
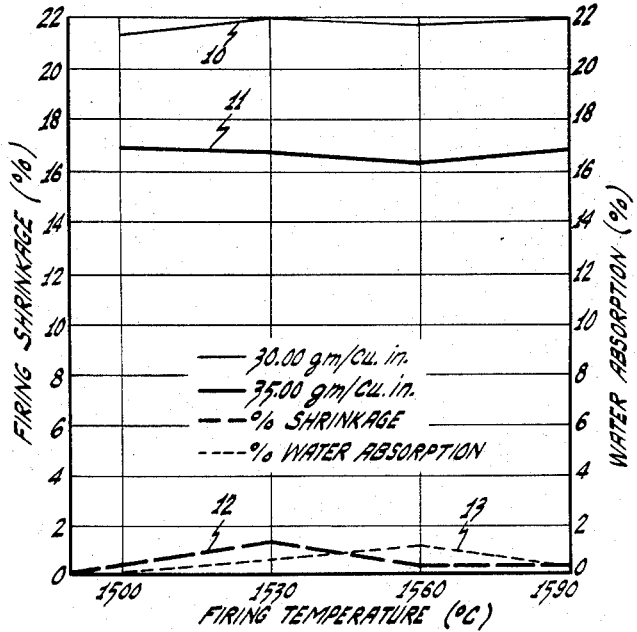
Figures 1A and 1B are graphs showing the variation of percent shrinkage and percent water absorption with firing temperature for two different ceramics according to this invention.

According to one feature of this invention, high-alumina ceramics with the mechanical and electrical properties required for such applications as tube envelopes and electrode spacers can be produced by the addition of 1 to 3 percent pentacalcium trialuminate as a flux. If an equivalent amount of calcium oxide alone is employed as a flux, higher firing temperatures are required, and the ceramic exhibits greater electrical losses. Superior results are obtained only when the calcium oxide is fused with aluminum oxide in the molar proportion of 5:3 to form pentacalcium tri-aluminate prior to the incorporation of the calcium oxide in the ceramic.

The entire range of compositions described above yields excellent results. The modulus of rupture of ceramics prepared according to this invention ranges from 30,000 p.s.i. to over 40,000 p.s.i., depending on the particular combination. The beryllium oxide is an optional constituent, and useful compositions may be prepared which contain as much as 3 percent beryllium oxide, or contain none at all. Beryllium oxide should be added when particularly high heat conductivity is desired in the resulting ceramic.

The aluminum oxide and calcium oxide used should be relatively pure. Alcoa A-14 calcined alumina has been found to be a satisfactory form of aluminum oxide. Pure calcium oxide can be obtained by the pyrolysis of C.P. grade calcium carbonate.

An example of a desirable ceramic for electron tube components according to this invention has the following composition: 87 percent aluminum oxide, 6 percent magnesium oxide, 4 percent calcium silicate, and 3 percent pentacalcium tri-aluminate. The preparation of this ceramic will now be described.

The pentacalcium tri-aluminate is made first. Five parts by weight of C.P. grade calcium carbonate are band ball milled with 3 parts by weight of Alcoa A-14 calcined alumina for 8 hours in methanol. The mixture is dried and then fused by firing in air to about 1450° C. It has been found desirable to raise the temperature of the batch rapidly at first, and then more slowly. For example, the mix may first be heated rapidly so that a temperature of 1000° C. is attained in one hour then heated slowly so that 1450° C. is attained in five hours.

It will be understood that the above proportions are used only when calcium carbonate provides the calcium oxide. A pure grade of calcium oxide may be used instead of the calcium carbonate, in which case 48 parts by weight of calcium oxide are ball milled with 52 parts by weight aluminum oxide in methanol before firing the mixture.

The pentacalcium tri-aluminate thus formed is cooled to room temperature, and then powdered. Thereafter 3 parts by weight of the powdered pentacalcium tri-aluminate are ball milled with 87 parts powdered aluminum oxide, for example Alcoa A-14 calcined alumina, together with 6 parts by weight of magnesium oxide, such as Norton Company Magnorite, and 4 parts by weight calcium silicate. A suitable calcium silicate is Cabot Company Wollastonite. Preferably an organic binder is used during the ball milling step. The binder may for example be American Cyanamid Hyform 1201 (40 percent wax solids). A suitable ratio for example is 17.5 cc. American Cyanamid Hyform 1201 and 90 cc. water for each 100 grams of batch. After the batch has been ball milled with the binder and the water for 8 hours, the batch is de-aired in a vacuum desiccator and dried. The dried mass is granulated to −20 to +100 mesh, and pressed to an unfired density of about 35 grams per cubic inch. The pressed pieces are then vitrified by heating in air to about 1530° C. to 1590° C.

The resulting ceramic shrinks about 15 percent if fired at 1500° C., 17 percent at 1530° C., 17.5 percent at 1560° C. and 18 percent at 1590° C. The water absorption falls off rapidly from 2 percent if fired at 1500° C. to 0 percent at 1530° C.

The thermal expansion of the ceramic from 0° C. to 800° C. is $80.4 \times 10^{-7}$ in./in./° C.

The modulus of rupture or flexure strength of this composition is about 33,000 pounds per square inch if fired at 1530° C.

An impact test was used to evaluate the property of toughness, which is of primary importance in ceramic-to-metal seal bodies. This property was evaluated by noting the amounts of energy dissipated when a weighted pendulum arm strikes and breaks a test bar. The test bar is mounted vertically and supported in cantilever fashion. The breaking head is raised to a predetermined height and allowed to swing through the test bar. The height to which it swings after breaking the test bar is measured. The difference between the initial height and the final height is directly proportional to the energy dissipated in breaking the piece, and is a relative measure of its toughness. Experience with this test has shown that arbitrary impact units of 100 represent a high degree of toughness. This figure has been arbitrarily selected as the minimum value for satisfactory toughness in such applications as tube envelopes and ceramic-to-metal seals. The impact resistance of the ceramic according to this example increases from 145 units when fired at 1530° C. to 160 units when fired at 1590° C.

The dielectric constant of this ceramic is about 8.45. At 8.6 kilomegacycles, the power factor of this composition is about $8 \times 10^{-4}$ radians.

A ceramic composition which exhibits even higher modulus of rupture can be prepared according to the invention using 90 percent aluminum oxide, 4 percent magnesium oxide, 4 percent calcium silicate and 2 percent pentacalcium tri-aluminate. Test bodies of this composition indicated a modulus of rupture of over 42,000 pounds per square inch. The power factor of this composition is about $13 \times 10^{-4}$ radians. The dielectric constant is about 8.7 at 8.6 kilomegacycles. The fired density of this composition is about 58.8 grams per cubic inch. The toughness test described above showed an impact resistance of about 134 units.

It is believed that the addition of pentacalcium tri-aluminate produces superior ceramics because the index of refraction of pentacalcium tri-aluminate is low. It is known that the index of refraction of a solid is approximately proportional to the square root of the dielectric constant. Thus materials with a low refractive index form compositions having a low dielectric constant. Such compositions are better insulators and have small electrical loss factors, while at the same time the firing temperature of such high alumina compositions in accordance with this invention is lower because of the fluxing action of the calcium oxide present. The lower firing temperatures attained makes it possible to fire these ceramics in ordinary commercial kilns.

Two more useful ceramic compositions in accordance with this invention will now be described. The first composition contains 85 percent alumina, 4 percent magnesia, 2 percent beryllia, 6 percent calcium silicate, and 3 percent pentacalcium tri-aluminate. It should be noted that the characteristics of the fused ceramics are also dependent on both the firing temperature and the density of the unfired mixture. For example, the batch may be compressed to a density of 30 grams per cubic inch before firing. However, if the density of the batch before firing is 35 grams per cubic inch, the characteristics of the ceramic are altered. These changes are shown in the accompanying figures, in which the composition described above is marked as Body 1.

Another useful ceramic composition in accordance with this invention consists of 87.5 percent aluminum oxide, 6 percent magnesium oxide, 4 percent calcium silicate, and 2.5 percent pentacalcium tri-aluminate. This composition does not contain any beryllium, and is listed as Body 2 in the accompanying figures.

Referring to Figure 1A, curve 10 shows the percent firing shrinkage at varying firing temperatures for a batch having a density before firing of 30 grams per cubic inch, and the composition described above as Body 1. Curve 11 shows the variation for the same composition with a density before firing of 35 grams per cubic inch. It is seen that the firing temperature had little effect on percent shrinkage, but the batch having the higher density before firing exhibited considerably less shrinkage.

Curve 12 in Figure 1A shows the variation in percent water absorption for the same composition as that of curve 10 (Body 1) and the same density before firing (30 grams per cubic inch). Similarly, curve 13 shows the same composition, but with a higher density before firing (35 grams per cubic inch). It is seen that the less dense batch exhibited maximum percent water absorption when fired at 1530° C., while the more dense batch exhibited maximum percent water absorption when fired at 1560° C.

Figure 1B:
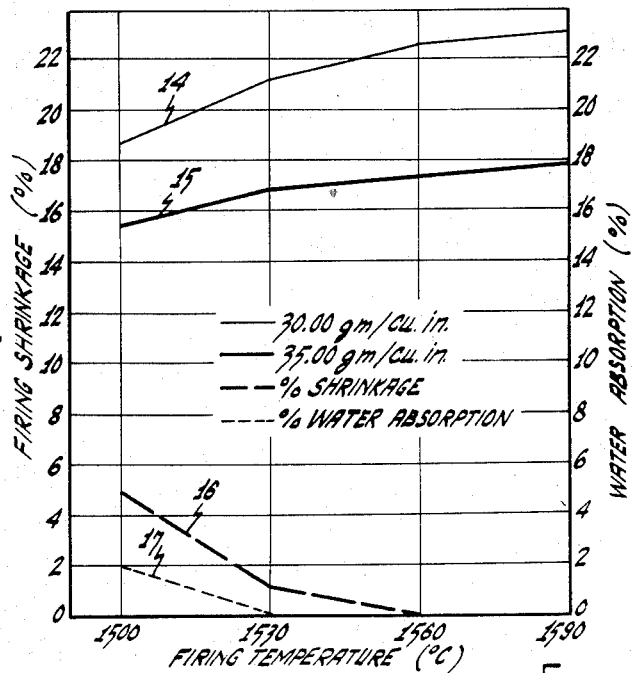

Referring to Figure 1B, curve 14 shows the percent firing shrinkage for a batch having a density before firing of 30 grams per cubic inch, and the composition described above as Body 2. Curve 15 is for the same composition, but with a density before firing of 35 grams per cubic inch. The less dense batch exhibits greater shrinkage. Shrinkage increases with increasing firing temperature in both cases, but the increase is greater for the less dense batch.

Curve 16 in Figure 1B shows the variation in percent water absorption for a batch having the same composition (Body 2) and density before firing (30 grams per cubic inch) as that of curve 14. Similarly, curve 17 shows the same composition, but with a higher density before firing (35 grams per cubic inch). In both cases, the percent water absorption decreases as the firing temperature increases.

Figure 2A:
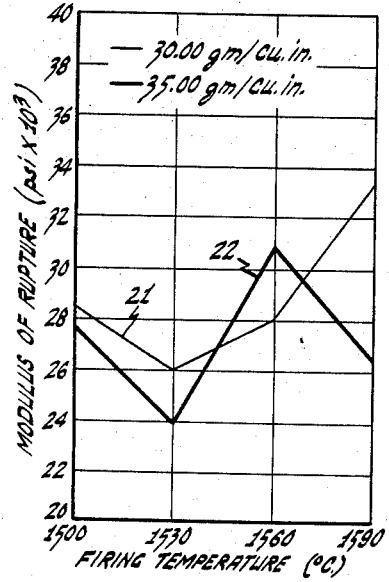
Figures 2A and 2B are graphs of the relation between modulus of rupture and firing temperature for the same two ceramic compositions.

Referring to Figure 2A, curve 21 shows the variation of modulus of rupture with the firing temperature for a batch having the composition of Body 1 and a density before firing of 30 grams per cubic inch. Curve 22 shows a batch having the same composition as Body 1 and a density before firing of 35 grams per cubic inch.

Figure 2B:
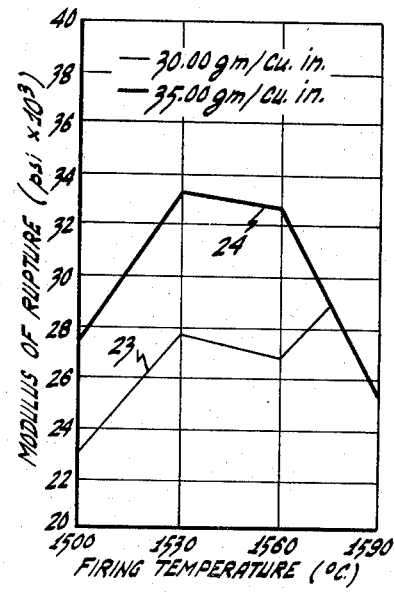

In Figure 2B, curve 23 shows the relation between modulus of rupture and firing temperature for a batch having the composition of Body 2 and a density before firing of 30 grams per cubic inch. Curve 24 shows a batch having the same composition as Body 2 and a density before firing of 35 grams per cubic inch.

Figure 3A:
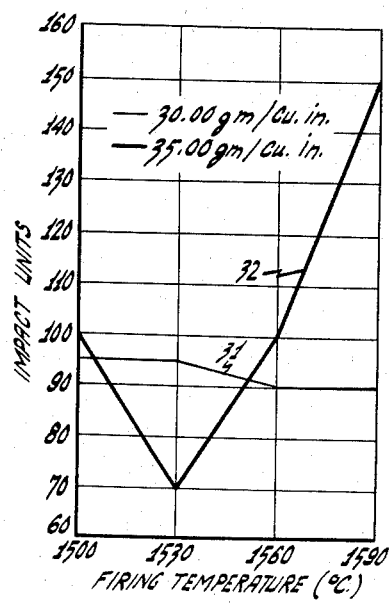
Figures 3A and 3B are graphs showing the relation between toughness and firing temperature for the same two compositions.

Referring to Figure 3A, curve 31 shows the relation between toughness and firing temperature for a ceramic having the composition of Body 1 and a density before firing of 30 grams per cubic inch. Toughness is measured in the arbitrary impact units described above. Curve 32 shows a batch having the same composition and a density before firing of 35 grams per cubic inch. In this case, the effect of firing temperature is much greater on the more dense batch.

Figure 3B:
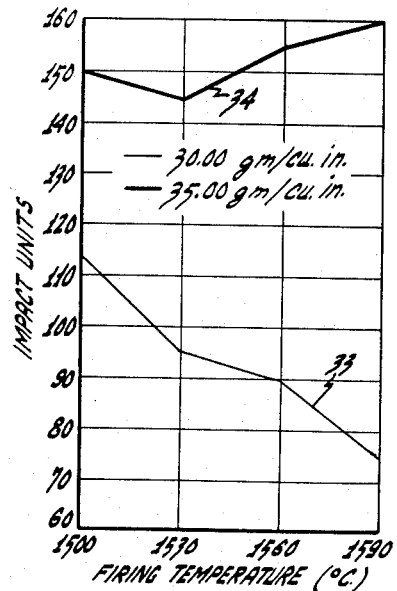

In Figure 3B, curve 33 shows the relation between toughness and firing temperature for a ceramic having the composition of Body 2 and a density before firing of 30 grams per cubic inch. Curve 34 shows a batch having the same composition as Body 2 but a density before firing of 35 grams per cubic inch. The less dense material is less tough, and its toughness decreases with increasing firing temperature, while the toughness of the more dense material increases with firing temperature.

Although it has been indicated that the product of this invention is particularly suitable for such applications as electron tube envelopes and spacing members, it will be understood that these ceramic bodies may be employed wherever a material is desired which is strong, inert, gas-tight, resistant to corrosion, has good thermal conductivity and is a good electrical insulator.

What is claimed is:

1. A ceramic composed essentially of 85 to 92 percent aluminum oxide; 4 to 7 percent magnesium oxide; 4 to 7 percent calcium silicate; 0 to 3 percent beryllium oxide; and 1 to 3 percent pentacalcium trialuminate.

2. The method of making a ceramic insulator with a modulus of rupture of about 30,000 to 40,000 pounds per square inch, which comprises making up a mixture consisting essentially of 85 to 92 percent powdered alumina, 4 to 7 percent powdered magnesia, 4 to 7 percent powdered calcium silicate, 0 to 3 percent beryllia, and 1 to 3 percent pentacalcium trialuminate, in addition to a temporary organic binder, pressing said mixture into pieces, and firing said pieces.

3. The method of making a ceramic insulator with a modulus of rupture of about 40,000 pounds per square inch, which comprises making up a mixture consisting essentially of 85 to 92 percent substantially pure powdered alumina, 4 to 7 percent pure powdered magnesia, 4 to 7 percent powdered calcium silicate, and 1 to 3 percent pentacalcium trialuminate, milling the mixture with an organic binder for about 8 hours, drying and granulating said mixture, pressing said dried mixture into pieces, and firing said pieces in air at about 1590° C.

4. A ceramic composed essentially of 87% aluminum oxide, 6% magnesium oxide, 4% calcium silicate, and 3% pentacalcium tri-aluminate.

5. A fired refractory insulating composition containing 90% aluminum oxide, 4% magnesium oxide, 4% calcium silicate, and 2% pentacalcium tri-aluminate.

6. A ceramic composed essentially of 85% alumina, 4% magnesia, 2% beryllia, 6% calcium silicate, and 3% pentacalcium tri-aluminate.

7. A ceramic composed essentially of 87.5% aluminum oxide, 6% magnesium oxide, 4% calcium silicate, and 2.5% pentacalcium tri-aluminate.

References Cited in the file of this patent

UNITED STATES PATENTS 2,680,692   Robinson _____ June 8, 1954

OTHER REFERENCES

Searle: Refractory Materials, 2nd Ed., Griffin and Co., London, 1924, page 410.